United States Patent [19]

Madden

[11] 4,351,446

[45] Sep. 28, 1982

[54] HIGH-SECURITY FILL CAP FOR UNDERGROUND STORAGE TANKS

[75] Inventor: Michael J. Madden, West Covina, Calif.

[73] Assignee: Pomeco Corporation, Paramount, Calif.

[21] Appl. No.: 284,614

[22] Filed: Jul. 20, 1981

[51] Int. Cl.³ .............................................. B65D 55/14
[52] U.S. Cl. .................................... 220/210; 220/314; 220/323; 138/89
[58] Field of Search ............... 220/210, 314, 318, 323; 138/89; 292/11, 30, 256, 258; 70/169

[56] References Cited

U.S. PATENT DOCUMENTS

| | | |
|---|---|---|
| 128,207 | 6/1872 | Booth et al. |
| 838,093 | 12/1906 | Emmons . |
| 865,810 | 7/1907 | Taylor . |
| 1,200,266 | 10/1916 | Strausser . |
| 1,224,934 | 5/1917 | Kenny . |
| 1,682,879 | 9/1928 | Wilson . |
| 1,817,796 | 8/1931 | Arnott . |
| 2,519,826 | 8/1950 | Ver Heyden et al. ................ 220/10 |
| 2,946,215 | 7/1960 | Eshlaugh et al. .................... 220/210 |
| 3,672,403 | 6/1972 | Wilson et al. ......................... 138/89 |
| 3,698,592 | 10/1972 | Nelson ................................ 220/55 Z |
| 3,722,549 | 3/1973 | Wilson et al. ........................ 138/89 |
| 3,907,155 | 9/1975 | Smith et al. ......................... 220/210 |

FOREIGN PATENT DOCUMENTS

| | | |
|---|---|---|
| 757093 | 12/1933 | France . |
| 120178 | 6/1927 | Switzerland . |
| 11179 | of 1896 | United Kingdom . |

Primary Examiner—George T. Hall
Attorney, Agent, or Firm—Phillips, Moore, Lempio & Majestic

[57] ABSTRACT

A high-security fill cap is adapted for releasable attachment to the open end of a fill pipe, connected to an underground fuel storage tank or the like. The fill cap comprises an annular cap, a plurality of latches pivotally mounted on the cap for movement between latched positions engaging the pipe and unlatched positions disengaging the pipe, an actuating mechanism, including a handle, for moving the latches between their latched and unlatched positions in response to reciprocal movement of the handle, and a key lock secured centrally within the handle to selectively rotate a cam plate thereof between its locked and unlocked positions beneath the cap.

16 Claims, 5 Drawing Figures

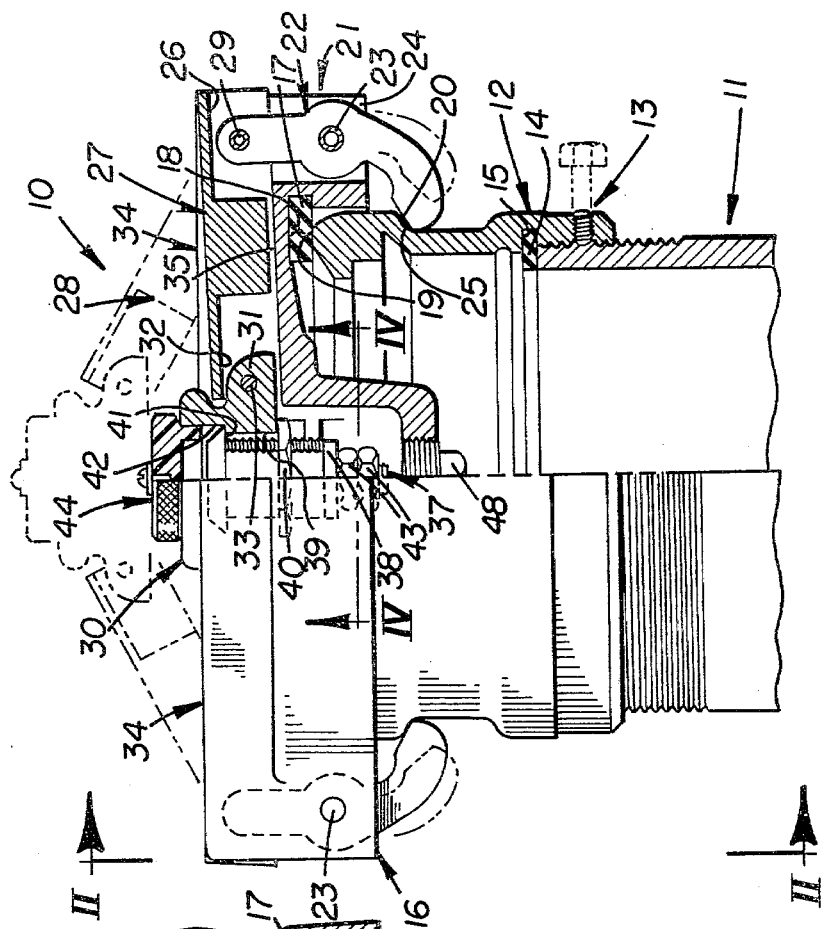
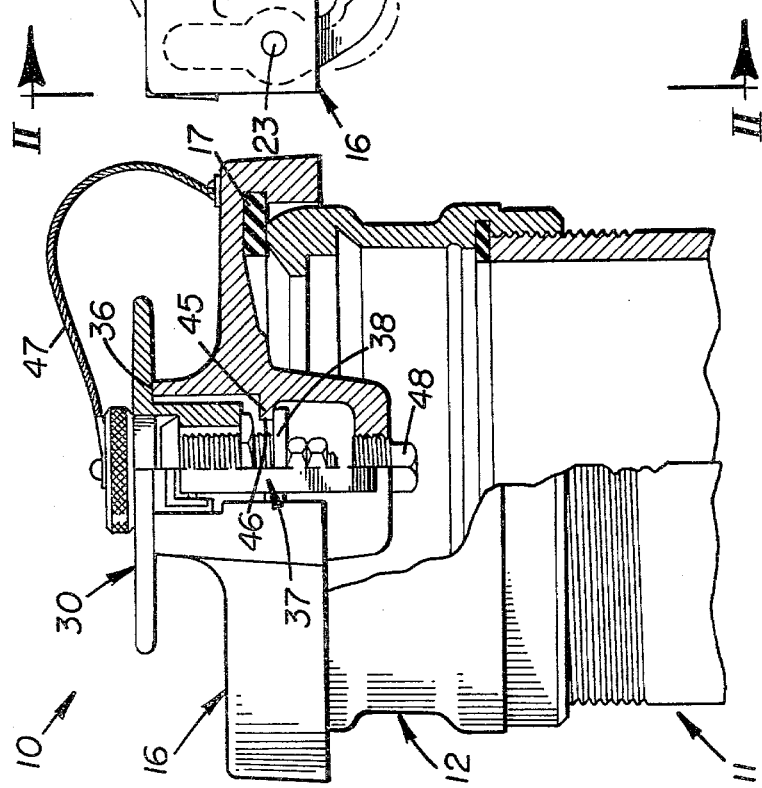

HIGH-SECURITY FILL CAP FOR UNDERGROUND STORAGE TANKS

TECHNICAL FIELD

This invention relates to a fill cap for an underground fuel storage tank, and more particularly to a fuel cap having a key lock for selectively releasing an actuating mechanism from a protected disposition on the fill cap to permit the fill cap to be removed from a fill pipe of the storage tank.

BACKGROUND ART

Underground fuel storage tanks located at service stations and the like are filled with fuel, such as gasoline or diesel oil, through a fill pipe normally closed by a removable fill cap. Commercially available fill caps of this type comprise an over-center linkage arrangement which is adapted to actuate a plurality of latches for releasing the cap from its locked position on the pipe. In its locked position, a standard padlock is attached between the linkage and the cap proper to maintain the cap in its locked position on the fill pipe.

The security of conventional fill caps of this type is marginal since the padlock and/or linkage can be readily broken. For example, a standard crowbar can be used to break open the fill cap. In addition, when the fill cap includes a post arrangement to guide reciprocal movements of an actuating handle for the linkage, the linkage may prove difficult to operate as a result of the collection of dirt, snow or the like around the post.

DISCLOSURE OF INVENTION

An object of this invention is to provide a fill cap that will exhibit a long service life and high degrees of structural integrity and security. The fill cap, adapted to be releasably attached to an open end of a fill pipe of a storage tank, comprises an annular cap adapted for sealing engagement with the pipe and latching means movably mounted on the cap between a latched position engaging the pipe and an unlatched position disengaging the pipe. The fill cap further comprises actuating means for moving the latching means between its latched and unlatched position in response to movement of the actuating means between lowered and raised positions, respectively, and locking means for selectively moving a locking lug thereof between a locked position retaining the actuating means in its lowered position and a released position permitting movement of the actuating means to its raised position. The locking means preferably comprises a standard key lock disposed centrally of the fill cap.

In another aspect of this invention a pair of rails are formed integrally on the cap to straddle and protect the pivot connections pivotally interconnecting each link of the actuating means between a handle thereof and a latch of the latching means. The rails further function as guide means to solely guide the pivotal movements of the link.

BRIEF DESCRIPTION OF THE DRAWINGS

Other objects and advantages of this invention will become apparent from the following description and accompanying drawings wherein:

FIG. 1 is a partially sectioned front elevational view of a high-security fill cap embodiment of this invention, releasably attached to a fill pipe of a storage tank;

FIG. 2 is a partially sectioned side elevational view of the fill cap;

BEST MODE OF CARRYING OUT THE INVENTION

Figure 3:
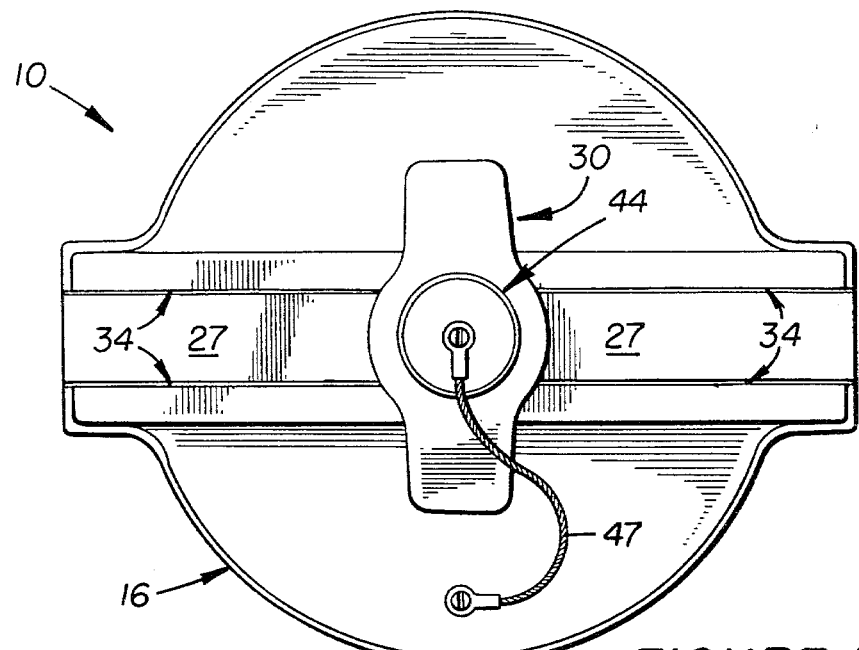
FIG. 3 is a top plan view of the fill cap.

FIGS. 1-3 illustrate a high-security fill cap 10 releasably attached to an open end of fill pipe 11, the fill pipe being connected in a conventional manner to an underground fuel storage tank or the like. The fill pipe may have an annular adapter 12 threadably mounted and secured thereon by a standard shear bolt 13. The shear bolt is threadably mounted through the adapter and will plastically deform the outer threads formed on the fill pipe proper whereafter the head-end of the bolt, shown in phantom lines, will break away after being subjected to maximum torque. An annular seal 14 is disposed in an annular recess 15, defined in the adapter, to engage an upper end of the fill pipe to provide a fluid-tight static seal thereat.

Fill cap 10 comprises an annular cap 16 having an annular seal 17 of rectangular cross-section mounted within an annular recess defined in the underside of the cap. When the cap is in its closed position illustrated in FIG. 1, seal 17 axially engages an upper end 19 of adapter 12 of fill pipe 11 to form a fluid-tight static seal thereat. An annular camming surface 20 is formed on the periphery of the adapter for purposes hereinafter explained.

Fill cap 10 further comprises latching means 21 movably mounted on cap 16 for movement between its illustrated latched position, engaging adapter 12 of the fill pipe, and an unlatched position, shown in phantom lines, disengaging the pipe. The latching means preferably comprises a plurality of first-class levers or latches 22, each pivotally mounted between first and second ends thereof on the periphery of cap 16 by a pivot pin 23. The latch and pivot pin are disposed within a pair of spaced bosses 24, formed integrally with the cap, for protection and security purposes.

In the preferred embodiment, latching means 21 comprises a pair of diametrically opposed latches 22, i.e., circumferentially spaced 180° from each other. A first end of each latch has a camming surface 25 formed thereon to cooperate with camming surface 20 of adapter 12 to pull the fill cap downwardly into sealed and locked position on the adapter and fill pipe. A second end of each latch 22 is pivotally mounted within a recess 26, defined on a radially outer end of a link 27 of an actuating means 28, by a pivot pin 29. Actuating means 28 further comprises a handle 30 disposed centrally on a vertically disposed longitudinal axis of the fill cap.

A radial inner end of each link 27 is pivotally mounted on a radial boss 31 of the handle with the boss and pivot pin being disposed within a recess 32, defined in the link for protection and security purposes. Handle 30 of the actuating means is adapted to move latches 22 of the latching means between their latched solid-line positions, illustrated in FIG. 1, and their unlatched phantom-line positions in response to reciprocal movement of the handle between its solid-line lowered position and its phantom-line raised position, respectively. It should be further noted in FIG. 1 that actuating means 28 is in the general form of a toggle mechanism wherein positioning of the handle in its lowered position, locking the fill cap in place, will dispose pivot pin 33 in an over-center disposition, vertically below pivot pin 29.

As more clearly shown in FIG. 3, lateral sides of each link 27 and pivot pins 29 and 33 are fully protected by a pair of straddling rails or fences 34 formed integrally with cap 21 with the rails extending radially outwardly from the handle to a respective latch 22 to terminate over bosses 24. A bottom surface 35, defined on the cap and between each pair of rails 34, is spaced slightly from the lower surface of link 27 when the fill cap is in its illustrated locked position. Surfaces 35 are slightly angled in diverging relationship to precisely accomodate pivot pin 33 in its above-mentioned over-center relationship, relative to pivot pin 29, when the cap is closed and locked, as shown in FIG. 1.

As shown in FIG. 2, a bottom surface of handle 30 will engage an upper surface 36 formed on the cap 16 to aid in maintaining actuating means 28 in its lowered, locked position. Laterally spaced outer surfaces of link 27 are preferably closely fitted within, but not guided by, laterally spaced inner surfaces of rails 34 and a substantial radial clearance is provided between the downwardly extending stem or boss of handle 30 and cap 16 (FIG. 2). Thus, movement of actuating means 28 between its lowered and raised positions is solely guided by the pivot pins and not by the rails. The small clearances between the outer surfaces of link 27 and the inner surfaces of rails 34 will prevent the impacting of a chisel point on pivot pin 29 to thus prevent nefarious removal of the fill cap.

Fill cap 10 further comprises a locking means 37, shown in the form of a standard key lock having a locking lug or cam plate 38, for selectively moving the cam plate between a locked position (FIGS. 2 and 4) retaining actuating means 28 in its illustrated lowered position and a released position permitting movement of the actuating means to its raised position. The standard key lock is secured within a bore 39, defined centrally of handle 30 and disposed on longitudinal axis of the fill cap, by a lock nut 40 which is threadably mounted on the housing of the key lock to engage an underside of the handle. Alternatively, a set screw could be treated through the thin-wall portion of boss 31 to engage and jam against a flat side of the key lock's body to secure it in position. The lock nut forces a flange 41 of the key lock into engagement with an annular surface defined by a counterbore 42.

Figure 4:
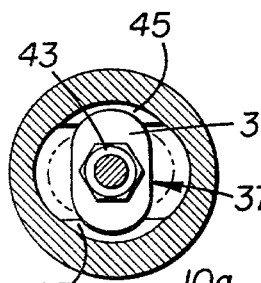
FIG. 4 is a sectional view, taken in the direction of arrows IV—IV in FIG. 1, illustrating the disposition of a cam plate of a key lock for locking the fill cap in place on the fill pipe.

A pair of lock nuts 43 are threadably mounted on a lower end of the key lock to retain cam plate 39 and attendant mechanisms in place within the key lock. The key lock operates in a conventional manner whereby removal of a plug 44, covering bore 39, will uncover a keyhole in the lock to facilitate insertion of a key into the keyhole to rotate a shaft (not shown) having cam plate 38 secured on the lower end thereof. The key cannot be removed until the fill cap is relocked in place. As shown in FIG. 4, rotation of the cam plate 90° will disengage the elongated cam plate from the underside of a pair of diametrically opposed and radially inwardly extending flanges 45, secured on cap 16. The cam plate will thus be positioned in alignment with an elongated opening 46 whereby the cam plate is enabled to move upwardly past the flanges.

Upon unlocking of the key lock in this manner to release the cam plate from flanges 45, upward pulling of handle 39 will function to pivot camming surfaces 25 of latches 22 out of engagement with camming surfaces 20 of coupling 21 whereby the full cap can be removed from fill pipe 11. Conversely, a pushing down of the handle to its lowered position illustrated in FIGS. 1-4 will function to re-engage camming surfaces 20, 25, the axis of pin 33 moving vertically downwardly below the axis of pin 29 into an overcenter position retaining the cam-lock relationship between camming surfaces 20 and 25. The key may then be rotated 90° to re-establish the locking engagement of cam plate 38 beneath flanges 45, as shown in FIGS. 2 and 4. Plug 44 can then be reinserted within counterbore 32 with a cable 47, secured between the plug and cap 16, ensuring that the plug will not become lost. It should be noted in FIG. 1 that a plug 48 is threadably secured within cap 16 to aid in providing a fluid-tight seal.

Figure 5:
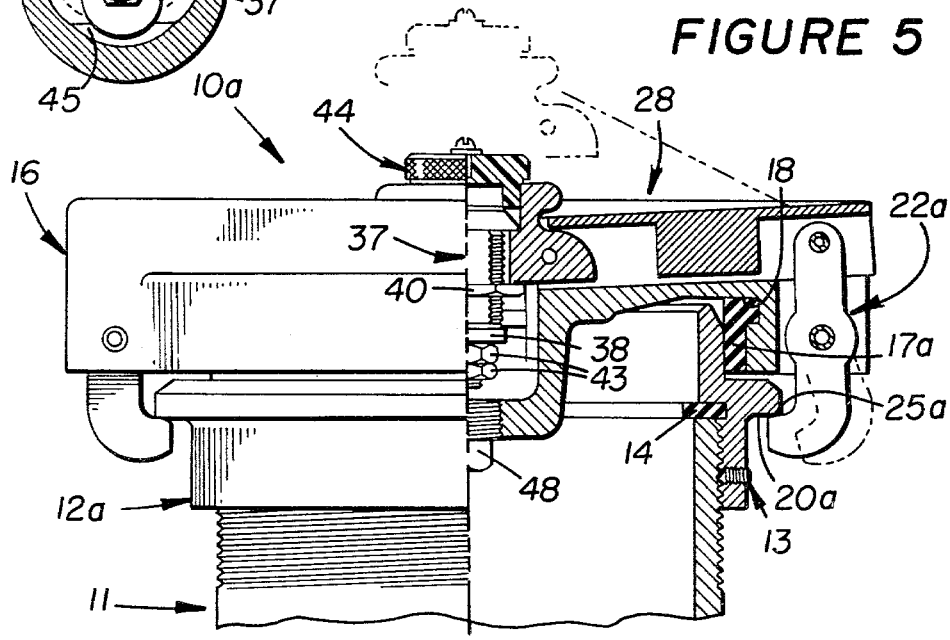
FIG. 5 is a view similar to FIG. 1, but illustrates a modification of the fill cap to accomodate a radial seal in contrast to the axial seal employed in the FIGS. 1-4 fill cap.

FIG. 5 illustrates a slightly modified fill cap 10a and coupling 12a wherein identical numerals depict corresponding constructions, but wherein numerals depicting modified constructions are accompanied by an "a." The FIG. 5 filler cap embodiment essentially differs from the FIGS. 1-4 embodiment in that a modified seal 17a forms a radial rather than an axial seal by its engagement with an outer circumferential surface of a modified adapter 12a. It should be further noted that recess 18, defined internally within cap 16, remains the same in that seal 17a exhibits an inverted L-shape when viewed in cross section and is longitudinally, rather than radially, disposed within the recess. Each latch 22a is slightly modified to provide a camming surface 25a at the lower end thereof, adapted to engage a camming surface 20a defined on the underside of a radial flange of adapter 12a. Otherwise fill cap 10a functions substantially identically to fill cap 10.

It can be surmised from the above description that both fill cap embodiments 10 and 10a will provide high degrees of structural integrity and security against tampering. For example, link 27 and pivot pins 29 and 33 are fully protected and "fenced-in" by rails 34 and thus would pose great difficulty for anyone attempting to tamper therewith. Adapter 12, latches 22, and links 27 may be composed of a suitable steel or bronze alloy, whereas cap 16 may be composed of a high-strength aluminum or bronze alloy to prevent sparking. Handle 30 may be composed of a more frangible material, such as a relatively low strength aluminum-based alloy, whereby any initial attempt to break the handle with a crowbar, for example, would break the handle and not destroy the locked integrity of the fill cap. Furthermore, shear bolt 13 will prevent adapter 12 from being unthreaded from the fill pipe proper to further add to the security of the overall fill cap arrangement.

I claim:

1. A high-security fill cap adapted for releasable attachment to a fill pipe of a storage tank comprising
    an annular cap adapted for sealing engagement with an open end of said pipe,
    latching means movably mounted on said cap for movement between a latched position engaging said pipe and an unlatched position disengaging said pipe,
    actuating means for moving said latching means between its latched and unlatched positions in response to movement of said actuating means between lowered and raised positions, respectively, and locking means, including a locking lug, for selectively moving said locking lug between a locked position retaining said actuating means in its lowered position and a released position permitting movement of said actuating means to its raised position.

2. The high-security fill cap of claim 1 wherein said latching means comprises a pair of latches pivotally mounted on diametrically opposite sides of said cap and wherein said actuating means comprises a centrally disposed handle and a link pivotally interconnected between said handle and each of said latches, said cap further comprising a pair of rails formed integrally therewith and laterally disposed on the sides of each of said links and fully covering the pivotal connections between said link and each of said handle and said latch when said actuating means, including said handle, is in its lowered position.

3. The high-security fill cap of claim 2 wherein laterally spaced outer surfaces of said link are closely fitted within laterally spaced inner surfaces of said pair of rails and a substantial radial clearance is provided between said handle and said cap, when said actuating means is in its lowered position.

4. The high-security fill cap of claim 2 further comprising a bearing surface formed on an upper side of said cap for engaging an underside of each of said links when said actuating means, including said link, is in its lowered position.

5. The high-security fill cap of claim 4 further comprising another bearing surface formed centrally on an upper side of said cap for engaging an underside of said handle when said actuating means, including said handle, is in its lowered position.

6. The high-security fill cap of claim 1 wherein said actuating means comprises a handle movable between said lowered and raised positions and having a central bore formed therethrough, disposed on a longitudinal axis of said cap, said cap having at least one flange secured thereon to extend radially inwardly toward said axis, and said locking means includes key lock means for selectively rotating said locking lug between its locked position beneath said flange and its released position.

7. The high-security fill cap of claim 6 further comprising plug means for closing an upper end of said bore to cover said key lock means.

8. The high-security fill cap of claim 1 further comprising annular sealing means mounted on an underside of said cap for axially engaging the open end of said pipe in sealing contact therewith.

9. The high-security fill cap of claim 1 further comprising annular sealing means mounted radially on an inner side of said cap for engaging an outer side of said pipe in sealing contact therewith.

10. The high-security fill cap of claim 1 further comprising a fill pipe having an adapter threadably mounted on an end thereof and a shear bolt threadably mounted through said adapter and plastically deforming outer threads formed on said fill pipe to secure said adapter thereon.

11. In a high-security cap having an annular cap, a pair of diametrically opposed latches pivotally mounted on a periphery of said cap, a centrally disposed handle movable between lowered and raised positions, and a link pivotally interconnected between said cap and each of said latches, the improvement comprising a pair of rails formed integrally on said cap to extend radially outwardly from said handle to each of said latches to fully cover the pivot connections between said links and each of said handle and said latches.

12. The high-security cap of claim 11 further comprising locking means, including a locking lug, for selectively moving said locking lug between a locked position retaining said handle in its lowered position and a released position permitting movement of said handle to its raised position.

13. The high-security fill cap of claim 11 further comprising a bearing surface formed on an upper side of said cap for engaging an underside of each of said links when said handle is in its lowered position.

14. The high-security fill cap of claim 13 further comprising another bearing surface formed centrally on an upper side of said cap for engaging an underside of said handle when said handle is in its lowered position.

15. The high-security fill cap of claim 12 wherein said handle has a central bore formed therethrough, disposed on a longitudinal axis of said cap, said cap having at least one flange secured thereon to extend radially inwardly toward said axis, and said locking means includes key lock means for selectively rotating said locking lug between its locked position beneath said flange and its released position.

16. The high-security fill cap of claim 15 further comprising plug means for closing an upper end of said bore to cover said key lock means.

* * * * *